Feb. 10, 1942.  O. P. WILLIAMS  2,272,314
MEAT AND FOWL TURNER AND LIFTER
Filed Sept. 30, 1940
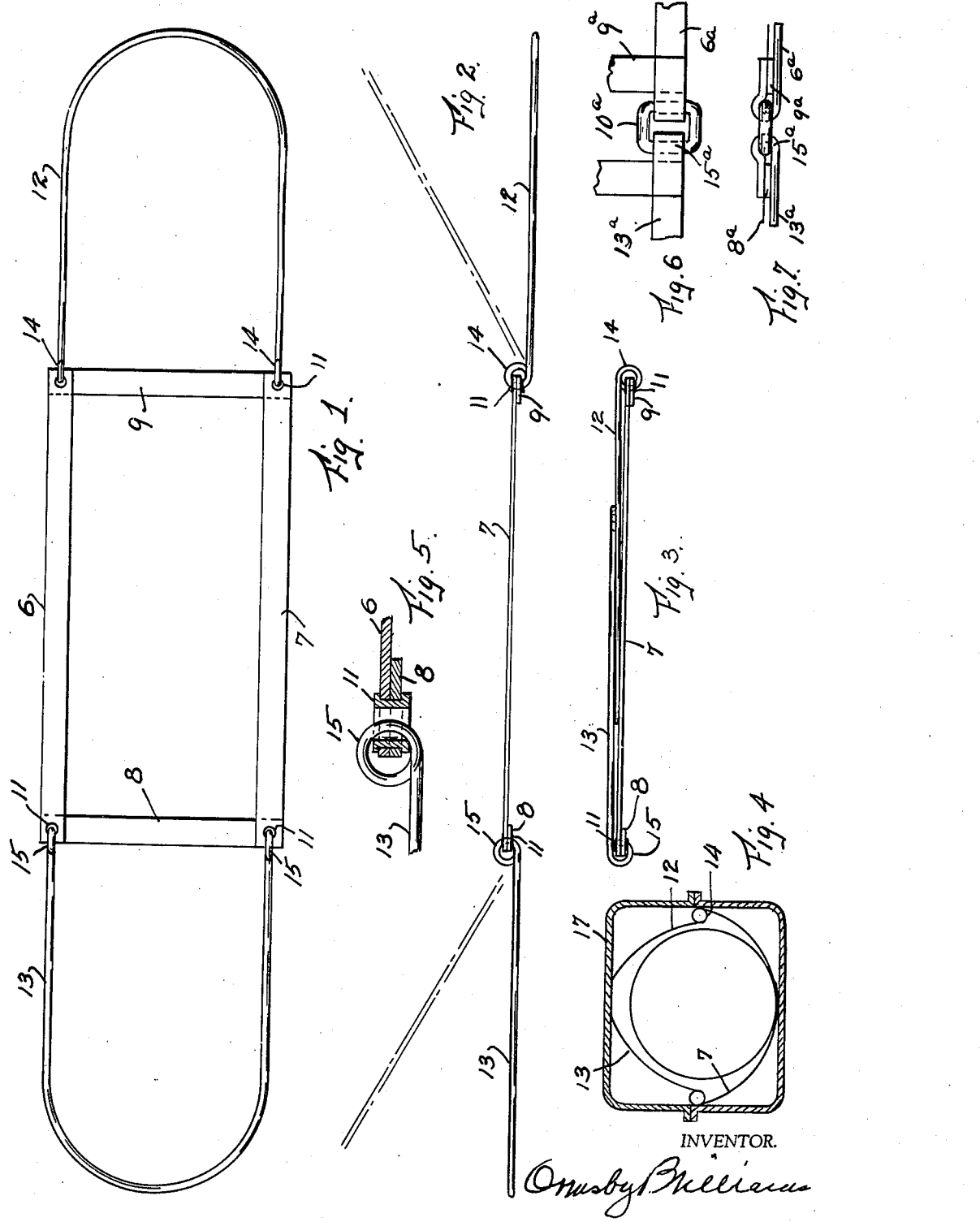
INVENTOR.
Ormsby P. Williams Patented Feb. 10, 1942

2,272,314

UNITED STATES PATENT OFFICE 2,272,314

MEAT AND FOWL TURNER AND LIFTER

Ormsby P. Williams, Huntington Park, Calif.

Application September 30, 1940, Serial No. 358,975

4 Claims. (Cl. 53—6)

My invention relates primarily to a meat and fowl turner and lifter by means of which meat, such as a roast, or a fowl being roasted, may be turned while being cooked without removing the same from the pan or container in which it is being cooked or roasted and lifted from the container when the roasting is completed, and it has for its prime object the production of a device of that character by means of which the fowl or other meat being roasted may be turned or rotated during the process of cooking so that all sides thereof may be evenly cooked, and when the cooking process has been completed utilized to remove the cooked article from the pan.

Another object is to produce a device of the above character which will be cheap to manufacture, simple in construction and very efficient in operation.

Another object is to provide a device of the above character which may be folded or collapsed for shipment of storage.

Other objects and advantages will appear hereinafter and, while I have shown and will describe the preferred form of my invention, it will be understood that I do not limit myself to such preferred form but that various changes and adaptations may be made therein without departing from the spirit of my invention.

In the drawing accompanying and forming a part hereof:

Fig. 1 is a top plan of my device in its extended position ready for use.

Fig. 2 is an edge elevation of Fig. 1.

Fig. 3 is an edge elevation of my device in its folded or collapsed position.

Fig. 4 is a diagrammatic illustration showing my device in its position of use.

Fig. 5 is an enlarged fragmentary detail of a portion of my preferred form.

Figs. 6 and 7 are enlarged fragmentary details of a modified form of construction of a portion of my device.

Referring to the drawing my device comprises a substantially rectangular frame composed of the side members 6 and 7 and the end members 8 and 9 connected together at their ends by means of hollow rivets or eyelets 11. Extending outwardly from each of the ends 8 and 9 are the handles 12 and 13 which are substantially U-shaped and have the ends of their legs terminating in eyes 14 and 15 which pass through the eyelets 11 so as to form hinged connections between said handles and said frame. It will be understood, of course, that the frame and handles will be constructed of tempered or resilient metal or the like so as to bend freely to conform to the shape of the meat or fowl being roasted as hereafter explained.

In the form shown in Figs. 6 and 7 the ends of the side members 6a project beyond the cross members 9a and are then bent upwardly to form eyelets 10a the members 9a being positioned between the folded portion of members 6a and the whole being spot welded or otherwise secured together the handles 13a being similarly formed with the exception that the cross piece is omitted. A link 15 mounted in the eyelets 10a and 11a, in the respective members 6a and 13, serves to form a hinged connection therebetween.

In the use of my device the fowl or roast will be positioned centrally of the rectangular frame with the sides thereof extending transversely of the fowl or roast. The handles 12 and 13 will then be utilized to lift and place the same together with my device within the pan 17, handles 12 and 13 being folded over the fowl or roast after the same has been so positioned, said handles being sufficiently flexible to allow for the positioning of the cover upon the roaster.

When it is desired to turn the fowl or roast during the cooking process the handles will be grasped and one raised sufficiently above the other to force the fowl or roast to rotate the amount desired and the handles may then be again folded over the fowl or roast, this process being repeated until the entire surface of the fowl or roast has been turned.

Having described my invention, what I claim is:

1. A device of the character described composed of side and end members of resilient material rigidly connected together at their ends to form a rectangular frame; eyelets extending through each of the corners of said frame; end members extending outwardly from each end of said frame, said end members being of resilient material and substantially U-shaped and having the ends of their legs bent to form eyes for engagement with said eyelets to provide hinged connection between said end members and said frame whereby said members may be folded to lie superposed one upon the other.

2. A device of the character described composed of side and end members formed of resilient material connected together at their ends to form a rectangular frame; end members extending outwardly from each end of said frame, said end members being formed of resilient material and substantially U-shaped and having the ends of their legs hingedly connected to the ends of said frame whereby said members may be folded to lie superposed one upon the other.

3. A device of the character described composed of side and end members of resilient material rigidly connected together at their ends to form a rectangular frame; end members extending outwardly from each end of said frame, said end members being formed of resilient material and substantially U-shaped, hinge connections between the ends of said frame and the ends of the legs of the end members, whereby said frame and end members may be positioned to extend in lengthwise alinement or to be folded to lie superposed one upon the other.

4. A device of the character described composed of side and end members of resilient material rigidly connected together at their ends to form a rectangular frame; eyelets in the ends of said frame at the sides thereof; end members extending from each end of said frame in lengthwise alinement therewith formed of resilient material and substantially U-shaped and having the ends of their legs terminating in eyelets, and link members pivotally connecting the adjacent eyelets of said end and frame members whereby said members may be positioned to extend in lengthwise alinement or folded to lie superposed one upon the other.

ORMSBY P. WILLIAMS.